US011334141B2

(12) United States Patent
Zaretsky et al.

(10) Patent No.: US 11,334,141 B2
(45) Date of Patent: May 17, 2022

(54) SYSTEM AND METHOD FOR DYNAMIC POWER CONTROL BASED ON A CACHE SIZE IN VOLATILE MEMORY

(71) Applicant: Dell Products L.P., Round Rock, TX (US)

(72) Inventors: Lee B. Zaretsky, Pflugerville, TX (US); Srinivas Kamepalli, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 307 days.

(21) Appl. No.: 16/778,104

(22) Filed: Jan. 31, 2020

(65) Prior Publication Data

US 2021/0240248 A1   Aug. 5, 2021

(51) Int. Cl.
*G06F 1/3225*   (2019.01)
*G06F 12/0804*   (2016.01)
*G06F 1/26*   (2006.01)
*G06F 1/28*   (2006.01)

(52) U.S. Cl.
CPC ........ *G06F 1/3225* (2013.01); *G06F 12/0804* (2013.01); *G06F 1/26* (2013.01); *G06F 1/28* (2013.01); *G06F 2212/1036* (2013.01)

(58) Field of Classification Search
CPC . G06F 1/26; G06F 1/28; G06F 1/3225; G06F 12/0804; G06F 2212/1036
See application file for complete search history.

(56) References Cited

U.S. PATENT DOCUMENTS

| 9,977,478 B1* | 5/2018 | Morning-Smith | G11C 5/148 |
| 2018/0074716 A1* | 3/2018 | Li | G06F 3/0688 |
| 2020/0106890 A1* | 4/2020 | Chan | H04M 19/08 |

* cited by examiner

*Primary Examiner* — Terrell S Johnson
(74) *Attorney, Agent, or Firm* — Baker Botts L.L.P.

(57) ABSTRACT

A system and method for ensuring information present in volatile memory is moved to persistent memory before power is removed. An information handling system stores a time value corresponding to an amount of time for power to be supplied to the information handling system after a signal is received to power down the information handling system. An embedded controller determines the amount of information present in volatile memory, determines an amount of time needed to move the information to persistent memory, and adjusts the time value as needed to ensure power is supplied to the system until the information has been moved to persistent memory.

15 Claims, 3 Drawing Sheets

SYSTEM AND METHOD FOR DYNAMIC POWER CONTROL BASED ON A CACHE SIZE IN VOLATILE MEMORY

BACKGROUND

Field of the Disclosure

This disclosure relates generally to information handling systems and, more particularly, to smart power control based on the amount of information or the size of a cache in volatile memory.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include devices such as notebook computers, media players, tablet computers and 2-in-1 tablet-laptop combination computers. Information handling systems may be coupled to a constant power source and a battery power source and may operate in a working state (also referred to as system power state S0), one or more sleep states (also referred to as system power states S1-S4) and a shutdown state (also referred to as system power state S5).

SUMMARY

In one aspect, an embedded controller communicatively coupled to components in an information handling system determines how much information is stored in volatile memory and ensures that, in the event of a power button override or other indication to remove power from an information handling system, all information present in volatile memory can be moved to persistent memory before power is removed or becomes unstable. The information may be present in a cache that can change size throughout operation based on processing by the information handling system. As the cache size increases or decreases, the amount of time needed to supply power to the information handling system to ensure information can be moved from volatile memory to persistent memory will also increase or decrease.

In one aspect, a disclosed method dynamically establishes battery run time based on the amount of information in volatile memory in order to allow an information handling system to flush information from a cache before power is removed from the information handling system. Due to the portability of some information handling systems, an information handling system may be operating on battery power. Embodiments minimize the amount of power needed to move information in order to minimally affect the available power in a battery.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
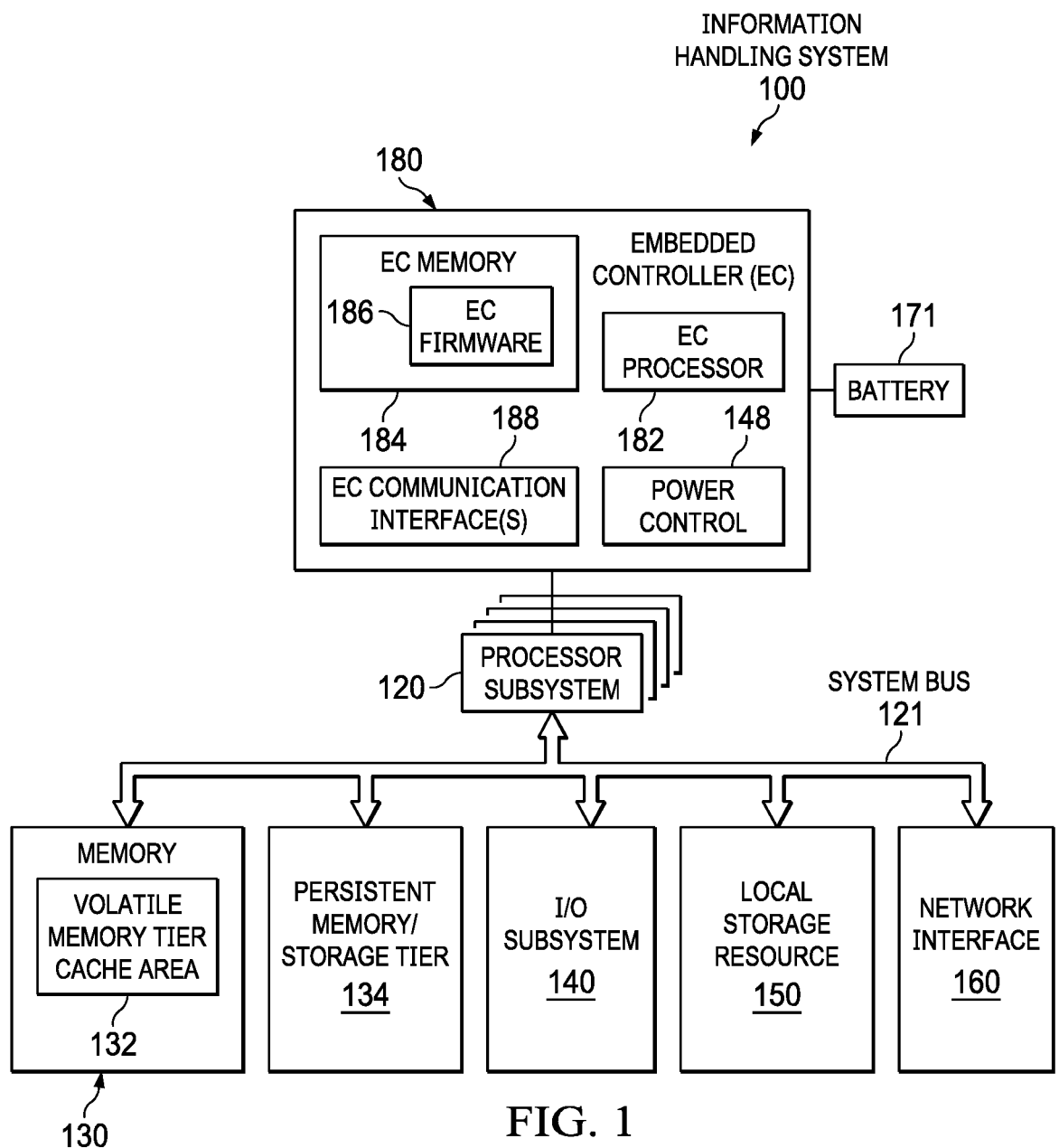
FIG. 1 is a block diagram of selected elements of an embodiment of an information handling system utilizing two-level memory.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72."

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a laptop, a tablet, a 2-in-1, or another device and may vary in size, shape, performance, functionality, and price. The information handling system includes volatile and persistent memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
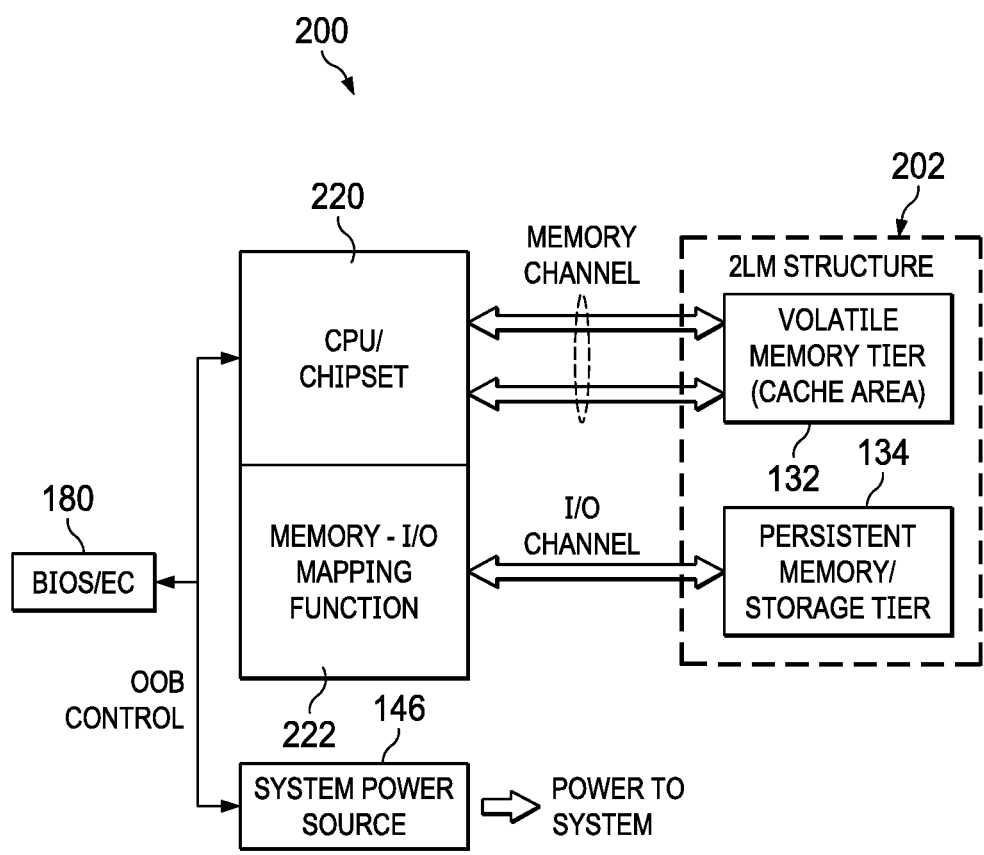
FIG. 2 is a block diagram of selected components for dynamically assessing the amount of information in volatile memory and adjusting the amount of time power is supplied to the information handling system to move information from volatile memory to persistent memory.
Figure 3:
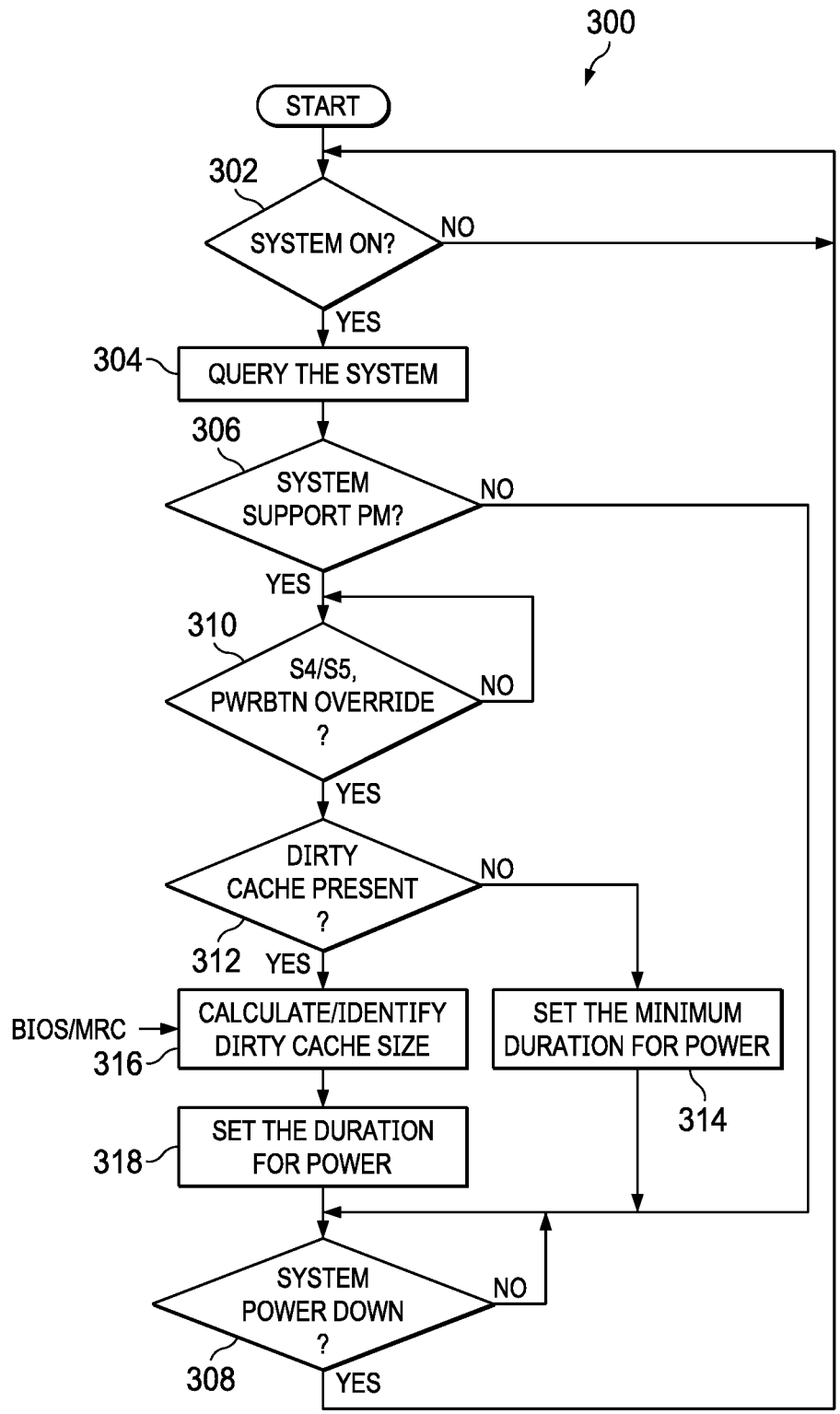
FIG. 3 is a flow diagram depicting a method for dynamically assessing and varying the amount of time allocated to move information from volatile memory to persistent memory in the information handling system of FIG. 1.

Particular embodiments are best understood by reference to FIGS. 1-3 wherein like numbers are used to indicate like and corresponding parts.

FIG. 1 illustrates a block diagram depicting selected elements of an embodiment of information handling system 100. As described herein, information handling system 100 may represent a personal computing device, such as a personal computer system, a desktop computer, a laptop computer, a notebook computer, etc., operated by a user. In various embodiments, information handling system 100 may be operated by the user using a keyboard and a mouse (not shown).

As shown in FIG. 1, components of information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, a network interface 160, an embedded controller 180, and a battery 171.

Processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130).

System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. In various embodiments, I/O subsystem 140 may be used to support various peripheral devices, such as a touch panel, a display adapter, a keyboard, an accelerometer, a touch pad, a gyroscope, or a camera, among other examples. In some implementations, I/O subsystem 140 may support so-called 'plug and play' connectivity to external devices, in which the external devices may be added or removed while portable information handling system 100 is operating.

In FIG. 1, local storage resource 150 may comprise computer-readable media (e.g., hard disk drive, floppy disk drive, CD-ROM, and other type of rotating storage media, flash memory, EEPROM, or another type of solid state storage media) and may be generally operable to store instructions and data, and to permit access to stored instructions and data on demand. One or more computer-readable media may be utilized for persistent memory 134. As used herein, persistent memory 134 is non-volatile data storage that holds contents across power cycles such that information is stored in all system power levels S0-S5.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol and/or standard, including, but not limited to, transmission protocols and/or standards enumerated below with respect to the discussion of the network. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network coupled to network interface 160 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network coupled to network interface 160 and/or various components associated therewith may be implemented using hardware, software, or any combination thereof.

As illustrated in FIG. 1, memory 130 may include a system, device, or apparatus operable to retain and retrieve program instructions and data for a period of time (e.g., computer-readable media). Memory 130 may include volatile memory 132, which requires power to maintain the information but is faster to access by processor 120. Examples of volatile memory 132 include static random access memory (SRAM) and dynamic random access memory (DRAM).

Two Level Memory (2LM) Using Volatile and Persistent Memory

Referring to FIG. 2, a two-level memory (2LM) architecture 200 of information handling system 100 incorporates volatile memory 132 and persistent memory 134 to benefit from the speed of volatile memory 132 and the storage properties of persistent memory 134. Using 2LM structure 202, information handling system 100 may store data in volatile memory 132 when information handling system 100 is awake and in persistent memory 134 when information handling system 100 is in a sleep mode (e.g., hibernation, also referred to as system power level S4) or completely shut down (also referred to a system power level S5). New and emerging workloads present opportunities to take advantage of two level memory (2LM) 202 capabilities. These capabilities include memory analytics, low latency data processing and overall improvement in system responsiveness for different client workloads.

To operate persistent memory 134 at system memory speeds, information handling system 100 may be configured with processor 120 communicatively coupled to 2LM architecture 202 having volatile memory 132 and persistent memory 134. Processor 120 may communicate with volatile memory 132 to benefit from the speed associated with volatile memory 132 and may communicate with persistent memory 134 to store information before information handling system 100 transitions to a sleep state or completely shuts down, as discussed in more detail below. Alternatively, to operate 2LM architecture 202 as system memory, processor 120 may communicate with both memories 132 and 134 as persistent memory to create a larger memory foot print and may communicate with local memory 150 to store information before information handling system 100 transitions to a sleep state or completely shuts down, as discussed in more detail below.

Ideally, information handling system 100 is able to move information from volatile memory 132 to persistent memory 134 (or alternatively, from memories 132 and 134 to local memory 150) before power is removed. However, a user may activate a power button override intended to cause an immediate hibernation or shutdown of information handling system 100. In each of these power button override scenarios, information handling system 100 has limited time to move information from volatile memory 132 to persistent memory 134 before information handling system 100 powers down. For information handling systems 100 not coupled to an uninterrupted power source (UPS), particularly portable information handling systems 100 that may need to operate on battery power, power needs to be supplied for an amount of time sufficient to move information present in volatile memory 132 into persistent memory 134 before information handling system 100 is allowed to power down.

Power Control System—Overview

Also shown in FIG. 1 are components of a system for ensuring power is supplied to information handling system 100 when system 100 receives a signal to power down to a sleep state or completely shut down. As illustrated in FIG. 1, information handling system 100 may include embedded controller (EC) 180, which may include EC processor 182 as a second processor included within portable information handling system 100 for certain management tasks, including supporting communication and providing various functionality with respect to moving information from volatile memory 132 to persistent memory 134 before removing power from information handling system 100. Thus, EC processor 182 may have access to EC memory 184, which may store a time value corresponding to an amount of time for power to be supplied to information handling system 100 after a signal is received to power down information handling system 100, as well as EC firmware 186 representing instructions executable by EC processor 182 to calculate an amount of time necessary to move information from volatile memory 132 to persistent memory 134, discussed below in more detail.

Embedded controller 180 may execute EC firmware 186 on EC processor 182. Furthermore, EC firmware 186 may be in control of EC communication interface(s) 188, which may represent one or more input/output interfaces or signals that embedded controller 180 can use to communicate with other elements of information handling system 100, such as processor subsystem 120, memory subsystem 130 and I/O subsystem 140, among others. In some embodiments, EC communication interface 188 may receive a signal to power down information handling system 100. The signal may be in the form of a power button override signal activated by a user wanting an immediate hibernation or shutdown of information handling system 100.

Also shown within embedded controller 180 is power control 148, which may be responsible for ensuring power is supplied to memory subsystem 130 in information handling system 100. In some embodiments, if EC 180 receives a signal that power is to be removed from information handling system 100 and determines that information is present in volatile memory 132 and that the information should be moved to persistent memory 134, then EC 180 may communicate with power control 148 to ensure power is supplied for the calculated amount of time needed to move the information.

Time Needed to Move Information to Persistent Memory Depends on Amount of Information The amount of time needed to move information from volatile memory 132 to persistent memory 134 depends on the amount of information in volatile memory 132. During operation of information handling system 100, the amount of information in volatile memory 132 will vary throughout processing. In a one-size-fits-all approach, a time value for an amount of time allocated to moving information to persistent memory 134 may have been set based on the maximum amount of information that could be present in volatile memory 132. While this ensures all components needed to move information to persistent memory 134 will have sufficient time to move the information, the amount of power needed to power down information handling system 100 is also maximized. In a simple implementation, the amount of time is stored is based on size of memory in the system, and this simplistic mechanism can be used rather than calculating information size.

System for Adjusting Time Allocated for Powering Down a System Based on Cache Size FIG. 2 depicts a schematic diagram of selected components for dynamically assessing the amount of information present in volatile memory 132 and adjusting the amount of time needed to supply power to information handling system 100 to move the information to persistent memory 134.

As discussed above and depicted in FIG. 2, CPU/chipset 220 is communicatively coupled to volatile memory 132 and persistent memory 134 in two-level memory architecture 202. CPU/chipset 220 may communicate with volatile memory 132 via memory channel and communicate with persistent memory 134 via I/O channel. CPU/chipset 220 manages the size of a cache in volatile memory 132. CPU/chipset 220 may also include memory-PO mapping function 222 that maps commands and responses associated with persistent memory 134.

Embedded controller (EC) 180 is communicatively coupled to CPU/chipset 220 and system power source 146. EC 180 may store BIOS or a portion thereof.

Communications between EC 180 and processor 120 allow EC 180 to query CPU/chipset 220 to determine if any information is present in a cache in volatile memory 132. Using the response to the query, EC 180 may dynamically calculate or determine how much time is needed to move information from volatile memory 132 to persistent memory 134 and ensures power is maintained to components necessary for moving information from volatile memory 132 to persistent memory 134 before allowing information handling system 100 to power down. In some embodiments, EC 180 is configured to determine one or more of a processor speed for processor 120, a throughput for volatile memory 132 and a throughput for persistent memory 134. Based on the amount of information in volatile memory 132, speed of processors 120, and throughput for volatile memory 132 and persistent memory 134, EC 180 may calculate an amount of time needed to move information from volatile memory 132 to persistent memory 134.

Method for Adjusting the Time Allocated to Moving Information Before Powering Down Referring now to FIG. 3, a method 300 for adjusting a time value associated with the amount of time allocated for moving information from volatile memory 132 to persistent memory 134 is described.

At step 302, EC 180 determines if information handling system 100 is "ON" or in a working state. If information handling system 100 is not turned on, then volatile memory 132 does not contain information and there is no need for EC 180 to change the amount of time allocated to moving information before powering down information handling system 100.

If information handling system 100 is turned on, then at step 304, EC 180 queries information handling system 100, which may include querying one or more of processor subsystem 120, memory 130, local storage resource 150 or network interface 160.

At step 306, information handling system 100 determines if persistent memory (PM) 134 is used to support processing by information handling system 100.

If persistent memory 134 is not being used by information handling system 100, then EC 180 does not need to adjust any processes or steps to power down, and at step 308, EC 180 monitors information handling system 100 to determine if information handling system 100 has received a signal to shut down.

However, if persistent memory 134 is supporting processing by information handling system 100, EC 180 may need to adjust the time duration that power should be supplied to information handling system 100 to ensure information is moved from volatile memory 132 to persistent memory 134.

At step 310, EC 180 determines if information handling system 100 has received an override signal from a power button. For example, a user may activate a power button override to signal information handling system 100 to power down to a sleep state (e.g., hibernate, also referred to as system power state S4) or to perform a complete shutdown (also referred to as system power state S5).

If no power button override is received, information handling system 100 continues operating in a working state and information may be present in volatile memory 132.

If a power button override signal is received, then at step 312, EC 180 determines if information is present in a cache in volatile memory 132. If information is present in a cache in volatile memory 132 but has not been stored to persistent memory 134, the cache may be referred to as a dirty cache.

If no information is present in volatile memory 132 (i.e., no dirty cache is present), then at step 314, EC 180 may set a time value equal to a minimum duration of time for power to be applied to information handling system 100.

If a dirty cache is present, then at step 316, EC 180 determines a size of the cache area in volatile memory 132.

Once EC 180 has determined the size of the cache in volatile memory 132, at step 318, EC 180 sets the time value equal to a time duration sufficient to enable information handling system 100 to move the information from volatile memory 132 to persistent memory 134.

Once power is supplied to information handling system 100 for the amount of time determined in step 318 and the information is stored in persistent memory 134, EC 180 determines if information handling system 100 is powered down (discussed above with respect to step 308).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A power control system for an information handling system (IHS) having a two-level memory comprising a volatile memory and a persistent memory, the power control system comprising:
    an embedded controller (EC); and
    a memory storing:
        a time value corresponding to an amount of time for power to be supplied to the information handling system before powering down the information handling system; and
        a set of instructions executable by the EC to:
            determine an amount of information present in the volatile memory;
            calculate an amount of time needed for the information handling system to move the information from the volatile memory to the persistent memory; and
            set the time value equal to the calculated amount of time needed for the processor to move the information from the volatile memory to the persistent memory.

2. The power control system of claim 1, wherein the EC is configured to:
    query the information handling system to determine if information is present in the volatile memory;
    if no information is stored in the volatile memory, set the time value equal to a minimum duration of time.

3. The power control system of claim 1, wherein the EC is configured to:
    query the information handling system to determine one or more of a latency and a throughput of the information handling system; and
    calculate the amount of time needed for the information handling system to move the information from the volatile memory to the persistent memory based on the amount of information present in the volatile memory and one or more of the latency and the throughput of the information handling system.

4. The power control system of claim 1, wherein the EC is configured to execute the set of instructions in response to a power button override signal.

5. The power control system of claim 4, wherein powering down the information handling system comprises one of powering down to a sleep state or shutting down, wherein information in the volatile memory is lost in the sleep state and when the information handling system is shut down.

6. An information handling system comprising:
    a processor;
    a two-level memory system comprising:
        a volatile memory configured for storing information in a cache when the information handling system is in a system working state; and
        a persistent memory configured for storing information when the information handling system is in a system sleep state or a system shutdown state;

an embedded controller (EC) communicatively coupled to the processor; and a memory storing:
- a time value corresponding to an amount of time for power to be supplied to the information handling system before powering down the information handling system; and
- a set of instructions executable by the EC to:
  - determine an amount of information present in the volatile memory;
  - calculate an amount of time needed for the information handling system to move the information from the volatile memory to the persistent memory; and
  - set the time value equal to the calculated amount of time needed for the processor to move the information from the volatile memory to the persistent memory.

7. The information handling system of claim 6, wherein the EC is configured to:
query the information handling system to determine if information is present in the volatile memory;
if no information is stored in the volatile memory, set the time value equal to a minimum duration of time.

8. The information handling system of claim 6, wherein the EC is configured to:
query the information handling system to determine one or more capabilities of the processor, the volatile memory and the persistent memory; and
calculate the amount of time needed for the information handling system to move the information from the volatile memory to the persistent memory based on the amount of information present in the volatile memory and the one or more capabilities of the processor, the volatile memory and the persistent memory.

9. The information handling system of claim 6, wherein the EC is configured to execute the set of instructions in response to receiving a power button override signal.

10. The information handling system of claim 9, wherein powering down the information handling system comprises one of powering down to a sleep state or shutting down, wherein information in the volatile memory is lost in the sleep state and when the information handling system is shut down.

11. A method for provisioning power for powering down an information handling system having a two-level memory architecture comprising a volatile memory and a persistent memory, the method comprising:
storing, in a memory associated with an embedded controller (EC), a time value for power to be supplied to the information handling system after a signal to power down the information handling system is received and before power is removed from the information handling system;
determining an amount of information present in the volatile memory;
calculating an amount of time needed for the information handling system to move the information from the volatile memory to the persistent memory; and
setting the time value equal to the amount of time needed for the processor to move the information from the volatile memory to the persistent memory.

12. The method of claim 11, further comprising:
determining if information is present in the volatile memory; wherein
if no information is present in the volatile memory, setting the time value comprises setting the time value equal to a minimum amount of time.

13. The method of claim 12, further comprising:
determining one or more of a processor speed, a throughput of the volatile memory, and a throughput of the persistent memory; and
if information is present in the volatile memory, setting the time value based on the amount of information present in the volatile memory and one or more of the processor speed, the throughput of the volatile memory, and the throughput of the persistent memory.

14. The method of claim 11, wherein setting the time value comprises determining the amount of time needed for power supplied to the information handling system to be stable.

15. The method of claim 11, wherein determining the amount of information present in the volatile memory is performed in response to receiving a power button override signal.

* * * * *